United States Patent [19]

Nagasaka

[11] Patent Number: 4,613,296
[45] Date of Patent: Sep. 23, 1986

[54] DEVICE FOR TIGHTENING A COIL ON A CYLINDRICAL BODY

[75] Inventor: Yasumasa Nagasaka, Aichi, Japan

[73] Assignee: Toyota Jidosha Kabushiki Kaisha, Toyota, Japan

[21] Appl. No.: 739,273

[22] Filed: May 30, 1985

[30] Foreign Application Priority Data

May 31, 1984 [JP] Japan .............................. 59-81388[U]
Jul. 3, 1984 [JP] Japan ........................... 59-100561[U]

[51] Int. Cl.⁴ .......................... B29F 1/03; F27B 14/00
[52] U.S. Cl. ...................................... 425/547; 249/78; 425/549
[58] Field of Search ................ 425/547, 549; 219/421; 249/78; 264/328.14, 328.15

[56] References Cited

U.S. PATENT DOCUMENTS

| | | | |
|---|---|---|---|
| 2,987,599 | 6/1961 | Voss | 219/19 |
| 3,091,812 | 6/1963 | Witkowski | 249/78 |
| 3,159,878 | 12/1964 | Scott et al. | 425/547 |
| 3,812,323 | 5/1974 | Pink | 219/535 |
| 4,173,448 | 11/1979 | Rees et al. | 425/549 |
| 4,266,723 | 5/1981 | Osuna-Dias | 425/549 X |
| 4,345,892 | 8/1982 | Schulte et al. | 425/549 X |
| 4,356,624 | 11/1982 | Coverstone et al. | 29/611 |
| 4,501,550 | 2/1985 | Nikkuni | 425/549 |
| 4,516,927 | 5/1985 | Yoshida | 425/549 |
| 4,517,453 | 5/1985 | Tautsumi | 425/549 X |
| 4,557,685 | 12/1985 | Gellert | 425/549 |

FOREIGN PATENT DOCUMENTS

| | | |
|---|---|---|
| 0070925 | 2/1983 | European Pat. Off. . |
| 2518024 | 11/1975 | Fed. Rep. of Germany . |
| 2816413 | 7/1979 | Fed. Rep. of Germany . |
| 2483157 | 11/1981 | France . |

Primary Examiner—J. Howard Flint, Jr.
Attorney, Agent, or Firm—Oblon, Fisher, Spivak, McClelland & Maier

[57] ABSTRACT

A heater device for tightening a coil on a cylindrical body which forms a passageway between an injector and a mold in an injection molding apparatus. The device has a first anchor for connecting one end of the coil to the cylindrical body, and a second anchor for connecting the second end of the coil to a rotatable ring on the cylindrical body. A threaded portion is arranged on the rotatable ring so that it engages directly with the cylindrical body or with a stationary ring member on the cylindrical body in a manner similar to a worm gear mechanism. Due to the rotation of the threaded member, a force is generated to stretch the coil, thus bringing the coil into positive contact with the surface of the cylindrical body along the entire length of the coil.

1 Claim, 13 Drawing Figures

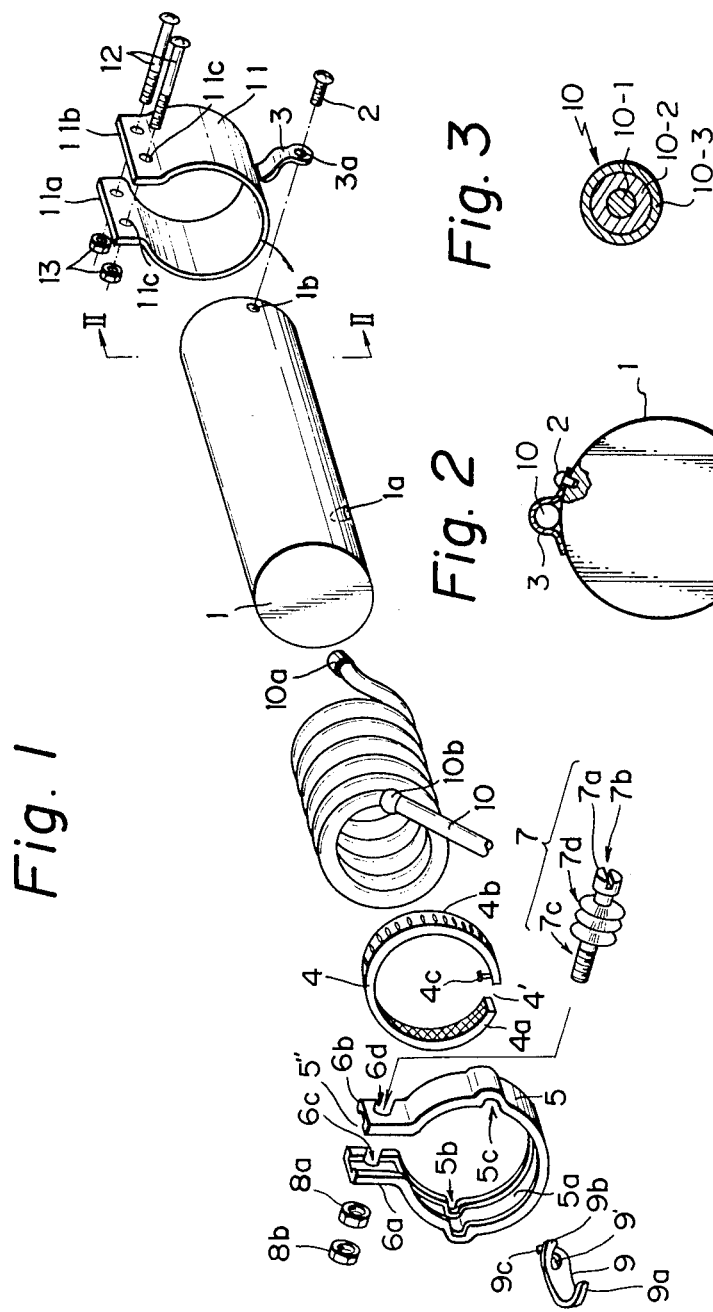

DEVICE FOR TIGHTENING A COIL ON A CYLINDRICAL BODY

BACKGROUND OF THE INVENTION

1. Field of the Invention

The present invention relates to a device for tightly fixing a coil on a cylindrical body. The present invention is suitable for use with a heating device for a hot sprue or hot runner of an injection moulding system.

2. Description of the Related Art

Known in the prior art is a heating device for a hot sprue or hot runner block in an injection moulding system, the heating device having a cylindrical body with a coiled heater made of sheathed heating wire arranged thereon, and a fixing band arranged around the coiled heater. This fixing band has facing flange portions, and clamping members such as bolts and nuts for connecting the facing flange portions of the band so that the coiled heater is held between the cylindrical body and the band.

The sheathed heating wire is pre-formed into the shape of a coil, the diameter of which is slightly larger than that of the cylindrical body. The coil shaped sheathed heating wire is pushed over and onto the cylindrical body, the band arranged around the coiled heating wire, and the clamping bolts then tightened.

However, this prior art device suffers from a drawback in that, since the diameter of the coil is larger than that of the cylindrical body, it is difficult to completely place the heater into direct contact with the surface of the cylindrical body along the entire length thereof, even if the heater is urged inward and tightened by means of the fixing band. As a result, gaps are generated between the coil heater and the cylindrical body, making it more difficult to transfer all of the heat from the heater to the cylindrical body.

To overcome this difficulty, another prior art device has proposed that the coil shape of the sheathed heater be determined in such a manner that the diameter of the coiled heater is slightly smaller than that of the cylindrical body. In this method, when the coiled heater is arranged on the cylindrical body the coiling must be first loosened to enable the coil to fit over the body. After the fitting of the coil, a fixing band is arranged around the coil in such a manner that the coil is tightened between the fixing band and the cylindrical body by the clamping bolts and nuts. However, this device suffers from a drawback in that the coil must be first loosened to allow the coil to be fitted on the cylinder, which requires extra work, and that a force for tightening the coil heater to place it completely in direct contact with the surface of the cylindrical body still cannot be obtained.

SUMMARY OF THE INVENTION

An object of the present invention is to provide a device capable of tightening a coil on a cylindrical body so that the coil is in positive contact with the surface of the cylindrical body along the entire length of the coil.

According to the present invention, a device for fixing a coil on a cylindrical body is provided, the coil having a coil portion arranged around the cylindrical body and first and second end portions, the device comprising: first anchor means for connecting the first end portion of the coil to the cylindrical body; a ring member arranged around the cylindrical body at a position axially remote from the first anchor means, this ring member being rotatable with respect to the cylindrical body; second anchor means arranged on the ring member for connecting a second end portion of the coil to the ring member; and means for rotating the ring member about an axis of the cylindrical body so that the second end portion of the coil is circumferentially moved with respect to the cylindrical body, whereby the coil portion is tightened around the cylindrical body.

BRIEF DESCRIPTION OF THE DRAWINGS

FIG. 1 is an exploded view of parts forming the construction of the present invention when applied as a heater assembly;

FIG. 2 is a sectional view taken along the line II—II in FIG. 1 illustrating how the coil is connected to the cylindrical body;

FIG. 3 is a sectional view of the heater wire used for forming the coil;

DESCRIPTION OF THE PREFERRED EMBODIMENTS

Figure 4:
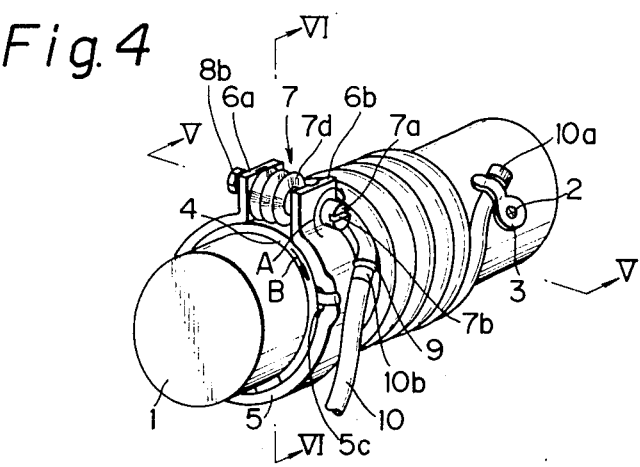
FIG. 4 is a perspective view of the heater assembly of the first embodiment when assembled.

An embodiment of the present invention will now be described with reference to the drawings. In FIG. 1, reference numeral 1 denotes a cylindrical body made of a metal material. The cylindrical body 1 has at its one end a substantially U-shaped clamp member 3. The clamp member 3 has at one end an opening 3a through which a bolt 2 is passed so that the clamp member 3 can be connected to the cylindrical body 1 by tightening the bolt 2 in a threaded hole 1b in the cylindrical body 1, as shown in detail in FIG. 2. The cylindrical body 1 has at the end opposite to the end having the clamp member 3 a fixing hole 1a extending radially toward the axis of the cylindrical body 1.

Reference numeral 4 denotes an inner or stationary ring 4 adapted for mounting on the cylindrical body 1. The ring 4 has a portion 4' which is completely cut-out, and a knurled inner surface 4a. The stationary ring 4 has an outer surface 4b provided with a plurality of circumferentially spaced notches axially inclined and resembling a skewed gear. At the end adjacent to the cut-out portion 4', the ring 4 has a pin 4c which is fixed to the inner surface of the ring 4 and which extends radially inwardly. When the ring 4 is arranged on the cylindrical body 1, the fixing pin 4c is engaged with the fixing hole 1a in the cylindrical body 1, so that the ring 4 is securely connected to the cylindrical body 1.

A movable or outer ring 5 is arranged around the stationary ring 4. The movable ring 5 has at its inner side a channel 5a in which the movable ring 4 rotates. The movable ring 5 also has a portion 5″ which is completely cut-out. At the cut-out portion 5″, the ring 5 defines a pair of opposite flanges 6a and 6b. The flange portions 6a and 6b, respectively, have a pair of slits 6c and 6d extending axially in such a manner that they are inclined with respect to the axis of the cylindrical body 1. The ring 5 has, at positions angularly spaced from the flange portions 6a and 6b, a pair of radially projected bent portions, which define inner recesses 5c and 5d having a substantially U-shaped cross-section.

Reference numeral 7 denotes a fixing member detachably arranged in the slits 6c and 6d. The fixing member 7 is adapted for turning the movable ring 5 with respect to the stationary ring 4. The fixing member 7 has, at its one end, an annular head 7a provided with a notch 7b and a screw thread 7c located at the other end. The fixing member 7 forms a worm thread portion 7d, which is adapted for engaging with the skewed notches 4b on the outer surface of the stationary ring 4, so that the movable ring 5 is rotated with respect to the stationary ring 4 when the screw 7 is turned. Nuts 8a and 8b are fitted to the screw thread 7c of the member 7 for locking the fixing member 7 so that it cannot be accidentally loosened.

Reference numeral 9 denotes an anchor member having a substantially U-shaped cross-section. The anchor member 9 is bent outward at one end. At the other end, the anchor 9 has tongues 9b and 9c which extend in opposite directions so that a slit 9′ is formed for engaging with an end of a coil.

Reference numeral 10 denotes a heater coil made from a sheathed heating wire. The heater coil 10 has at its ends annular stoppers 10a and 10b fixedly connected to the coil 10. The diameter of the coil 10 is such that it is slightly larger than that of the cylindrical body 1. The heater coil 10 is composed of a core wire 10-1 (FIG. 3) made from electric resistance material, an electric insulation layer 10-2 made from, for example, silicon, and an outer layer 10-3 made of a metal material. The annular stopper portions 10a and 10b are preferably integral with the outer layer 10-3.

Reference numeral 11 denotes a band having a substantially tubular shape. The band 11 has a pair of opposing flange portions 11a and 11b in which pairs of aligned holes 11c are formed, and bolts 12 are passed through the aligned holes 11c for tightening the flange portions 11a and 11b by tightening the nuts 13 engaged with the bolts 12.

Figure 5:
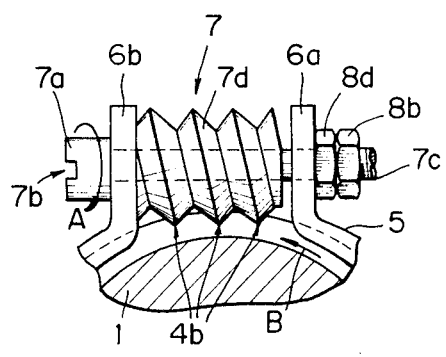
FIG. 5 is a sectional view taken along the line V—V in FIG. 4 illustrating the construction of the worm mechanism.
Figure 6:
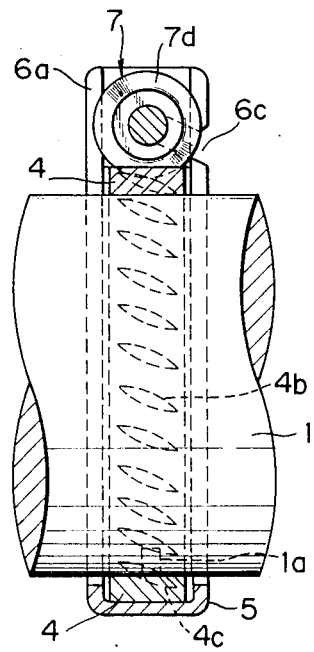
FIG. 6 is a sectional view taken along the line VI—VI in FIG. 4 illustrating the construction of the inner and outer rings.

The operation of the mounting device according to the present invention is as follows. The stationary ring 4 is fitted to the cylindrical body 1 in such a manner that the stopper pin 4c is engaged with the anchor hole 1a in the cylindrical body 1. Then the movable ring 5 is arranged around the stationary ring 4 in such a manner that the stationary ring 4 is fitted in the inner channel of the movable ring 5 and the anchor member 9 is arranged in the recess 5C (FIG. 4). The fixing member 7 is inserted in the opposed slits 6c and 6d of the flanges 6a and 6b, respectively, of the movable ring 5 in such a manner that the worm thread portion 7d engages with the skewed notches 4b formed on the outer surface of the stationary ring 4, shown in FIGS. 5 and 6. Before tightening the coil 10, the nuts 8a and 8b are loosened to permit the fixing member 7 to be freely rotated. As previously mentioned, the inner diameter of the coil 10 is determined in such a manner that it is slightly larger than that of the cylindrical body 1. Thus the coil 10 can be easily fitted onto the cylindrical body 1. The clamp member 3 is connected to the cylindrical body 1 by threading the bolt 2 into the hole 1b and the stopper member 10a at one end of the coil 10 engages with the clamp member 3 in such a way the stopper member 10a prevents the end of the coil 10 from slipping through the clamp 3, as shown in FIG. 4. The other end of the coil 10 is inserted in the slit 9 formed between the tongues 9b and 9c of the anchor member 9 in such a manner that the stopper 10b engages with and prevents the coil 10 from slipping through the tongues 9b and 9c. Then an appropriate tool, such as a screw driver, is engaged with the notch 7b on the head portion 7a of the fixing member 7, to rotate the fixing member 7 in the direction shown by an arrow A in FIG. 4. The rotation of the fixing member 7 causes the outer ring 5 to rotate with respect to the inner ring 4 in the direction shown by an arrow B in FIG. 4. This rotation is effected by the engagement of the worm portion 7d of the fixing member 7 with the skewed notches portion 4b of the inner ring 4. The rotation of the outer ring with respect to the inner ring 4 stretches the coil 10, one end of which is fixed to the outer ring 5 by the anchor 9, and thus the coil 10 is pulled tight on the surface of the cylindrical body 1. When the predetermined tightening force is attained, the turning movement of the fixing member 7 is stopped. The predetermined force is determined in such a manner that the coil 10 is in complete contact with the outer surface of the cylindrical body 1 along the entire length of the coil 10. When this complete contact condition is attained, the nuts 8a and 8b are tightened so that the fixing member 7 cannot be accidentally loosened.

After the coil 10 has been tightened, the band 11 in FIG. 1 is arranged around the coil 10, the bolts 12 are inserted in the flange portions 11a and 11b via the holes 11c and the bolts 12 are tightened in the nuts 13 so that band 11 is fixedly connected to the cylindrical body 1 with the coil 10 arranged between the band 11 and the cylindrical body 1.

According to the present invention, because the mechanism 7d resembling a worm gear is utilized, only a slight force is necessary for tightening the coil 10 on the cylindrical body 1 and for ensuring that the coil 10 is in positive contact with the surface of the cylindrical body 2 along the entire length of the coil 10.

Figure 7:
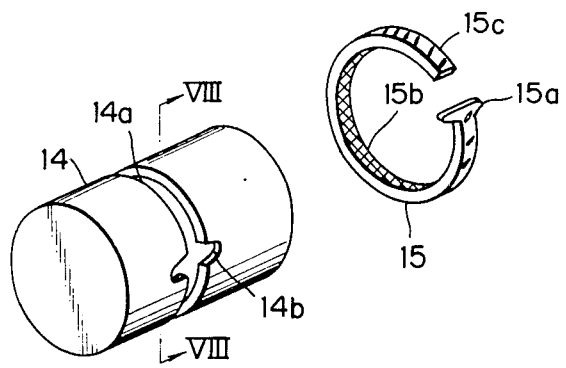
FIG. 7 is an exploded view of the variation of the cylindrical body and an inner ring.
Figure 8:
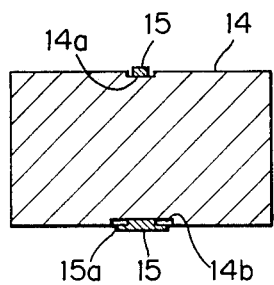
FIG. 8 is a sectional view taken along the line VIII—VIII in FIG. 7.

FIG. 7 shows an embodiment of the present invention in which a modification is made to a cylindrical body 14 and a stationary ring 5. In this embodiment, the cylindrical body 14 is provided with an annular groove 14a along the periphery of the cylindrical body 14. The annular groove 14a has a portion 14b in which the length is axially widened. The stationary ring 15 has an axially extending stopper portion 15a at a position near the cut-out portion. The stopper portion 15a is formed in one piece with respect to the remaining part of the ring 15. The dimension of the stopper portion 15a is such that it can be fitted to the widened portion 14b of the groove 14a in such a manner that the ring 15 is fixedly connected to the cylindrical body 1, as shown in FIG. 8.

Figure 9:
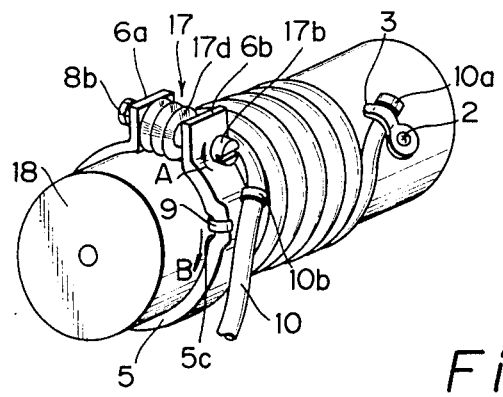
FIGS. 9, 10, and 11 illustrate the construction of a second embodiment of the present invention and correspond to FIGS. 4, 5, and 6 of the first embodiment, respectively.
Figure 10:
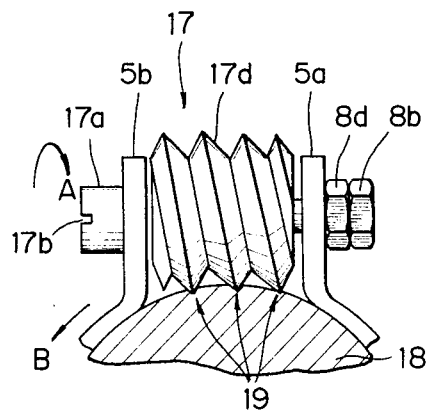
Figure 11:
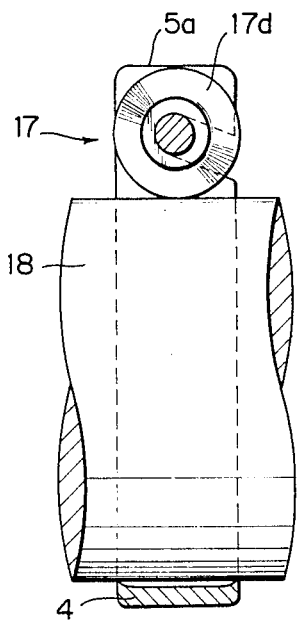

The embodiment of the present invention shown in FIGS. 9, 10, and 11 differs from the first embodiment shown in FIGS. 1 to 6 in that the stationary ring 4 is eliminated, and the fixing member 17 is formed as a self-tightening screw. To attain this self-tightening capability, the fixing member 17 is formed from a hardened steel material, and the edges of the threaded portion 17d are sharpened. Further, the cylindrical body 18 is made from a relatively soft material, such as copper, aluminum, zinc, or bronze. Other parts of the construction of this embodiment are substantially the same as that of the first embodiment. Therefore, the same reference numbers are used for parts having the same functions and a detailed description of the construction thereof is omitted.

When tightening the coil by the device shown in FIGS. 9, 10, and 11, one end of the coil 10 is fixed to the cylindrical body 18 by engaging the stopper portion 10a with the clamp 3. The other end of the coil 10 is engaged with the clamp 9 arranged in the recess 5c of the ring 5 which, in this embodiment, is directly arranged on the cylindrical body 18. The fixing member 17 having the sharpened threaded portion 17d is turned as shown by an arrow A in FIG. 9 by engaging a tool (not shown) with the notch 17b. Due to the rotation, the threaded portion 17d engages with the surface of the cylindrical body, which is made from a relatively soft material, and the edges of the threads 17d slightly penetrate the cylindrical body 18. This "self-tightening" action of the threaded portion 17d forms skewed notches 19 on the cylindrical body 18, which engage with the fixing member 17 and cause the ring 5 to rotate in the direction shown by an arrow B on the cylindrical body 18, thus pulling the coil 10 tight against the cylindrical body 18.

In this embodiment, due to the employment of the "self-tightening" fixing member 17, a predetermined constant force is continuously obtained for tightening the coil 10 on the cylindrical body 18.

Figure 12:
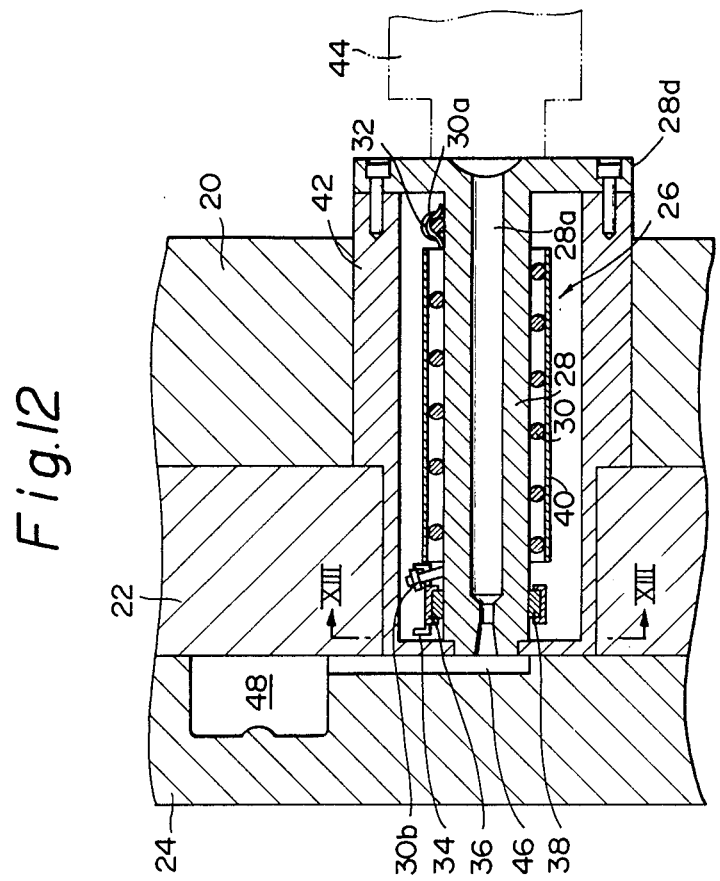
FIG. 12 shows a sectional view of an injection mould wherein the coil assembly according to the present invention is applied for a hot sprue.
Figure 13:
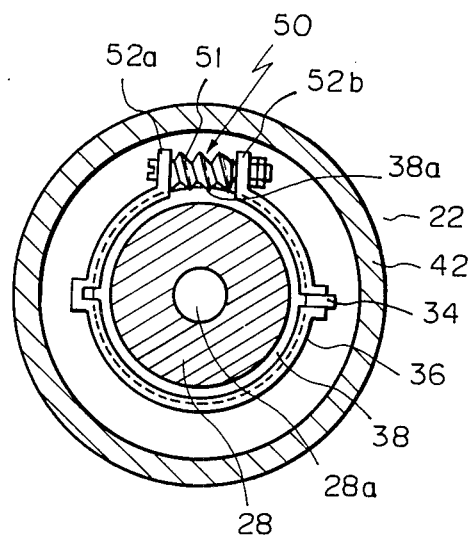
FIG. 13 shows a sectional view taken along XIII—XIII line in FIG. 12.

FIG. 12 illustrates an application of the coil tightening device of the present invention to a injection molding system. This application is directed toward a heating sprue in an injection mold. The mold has a first plate 20, a second plate 22, and a third plate 24. A heater assembly 26 extends across the first and the second plates 20 and 22. The heater assembly 26 has a cylindrical body 28 in which a sprue 28a is formed longitudinally therethrough. A heater coil 30 is arranged around the cylindrical body 28. A device for tightening the coil 30 on the cylindrical body 28 is provided. This device is constructed as already described with reference to FIGS. 1 to 8 or FIGS. 9 to 11. In FIG. 12, the device is realized as in the first embodiment. Namely, one end of the coil 30 is fixed to the cylindrical body 28 by means of a clamp 32 engaged with a stopper 30d on one end of the coil 30. The other end of the coil 30 is connected to a clamp 34 on the movable ring 36. The clamp 34 engages with a stopper 30b on the other end of the coil 30. The movable ring 36 is rotated with respect to a stationary ring 38 by a worm mechanism 50 similar to 7 in FIG. 5. The mechanism 50 having a worm screw 51 (FIG. 13) arranged between faced flanges 52a and 52b. The worm 51 engages skewed notches 38a on the inner ring 38. Due to the rotation of the outer ring 36 by rotating the screw 51, the coil 30 is tightened on the cylindrical body 28 so that it makes positive contact with the surface of the body 28. A band 40, which is similar to part 11 in FIG. 1, is then arranged around the coil 30. The cylindrical body 28 has a flange portion 28a which is connected to a cylindrical holder 42 inserted in the plates 20 and 22. Reference numeral 44 denotes an injection nozzle which is connected to one end of the sprue 28a.

During the injection molding, the melted plastic is introduced into the sprue 28a from the nozzle 44. The melt is then introduced into runners 46 formed between the plates 22 and 24. The melt from the runners 46 is introduced into a cavity 48 having a shape of the article to be produced. After the material has hardened, the plates 20, 22, and 24 are detached from each other in order to take the produced article from the cavity 48.

Due to the positive engagement of the coil 30 to the cylindrical body 28, the heat from the coil 30 is effectively transmitted to the melt passing through the sprue 28a to maintain the temperature of the melt. The cover 40 arranged around the coil prevents the heat of the coil from being emitted to the outside.

The present invention also may be applied for heating a runner. In this case, the heater unit as shown by 26 would be arranged around the runner. This arrangement allows the temperature of the melt in the runner to be maintained at a constant value.

While the invention is described with reference to particular embodiments, many modifications and changes may be made by those skilled in this art without departing from the scope and spirit of the invention.

I claim:
1. An injection moulding system comprising:
   an injector for generating a flow of molten material;
   a mould assembly defining a cavity corresponding to a product to be produced, and a passageway for connecting the injector with the cavity; and
   at least one heater assembly arranged adjacent to the passageway for heating the melt passing through the passageway; said heater assembly comprising:
   a cylindrical body having a hole extending longitudinally therethrough constructing at least a part of the passageway;
   a coil arranged around the cylindrical body, the coil having an original diameter slightly larger than that of the cylindrical body, the coil being made from a sheathed heater wire, said coil having stopper portions at its ends, which stopper portions are formed on the sheath of the wire;
   first anchor means for engaging with the first stopper portion and for connecting the first end portion of the coil to the cylindrical body;
   a ring member arranged around the cylindrical body at a position axially remote from the first anchor means, said ring member being rotatable with respect to the cylindrical body;
   second anchor means arranged on the ring member for engaging with second stopper portion and for connecting the second end portion of the coil to the ring member;
   means for rotating the ring member about an axis of the cylindrical body so that the second end portion of the coil is circumferentially moved with respect to the cylindrical body whereby the coil portion is tightened around the cylindrical body;
   a cover of tubular shape arranged around the coil; and
   means for tightening the cover so that the coil is closely arranged between the cover and the cylindrical body.

* * * * *